United States Patent [19]

Koga et al.

[11] 4,020,313
[45] Apr. 26, 1977

[54] ADJUSTABLE ELECTRODE POSITIONING DEVICE FOR ELECTRIC SPARK MACHINING APPARATUS

[76] Inventors: Mamoru Koga, 9-5 Hon-Komagome 2-chome, Bunkyo, Tokyo, Japan, 113; Masanori Matsunobu, 24 Sakae-cho 1-chome, Matsudo, Chiba, Japan, 271

[22] Filed: Aug. 27, 1975

[21] Appl. No.: 608,221

[30] Foreign Application Priority Data

Sept. 4, 1974 Japan ..................... 49-101706

[52] U.S. Cl. .................. 219/69 E; 204/297 R; 279/6
[51] Int. Cl.² ........................... B23P 1/08
[58] Field of Search ........... 219/69 R, 69 E, 69 V, 219/138; 279/6, 5, 1 L; 204/286, 279 R

[56] References Cited

UNITED STATES PATENTS

| | | | |
|---|---|---|---|
| 2,276,945 | 3/1942 | Ehrich | 279/6 |
| 3,438,275 | 4/1969 | Dunod | 219/69 V |
| 3,474,215 | 10/1969 | Johanson | 219/69 E |
| 3,592,937 | 7/1971 | Emeis | 279/6 X |
| 3,594,537 | 7/1971 | Morgenegg | 219/69 E |

FOREIGN PATENTS OR APPLICATIONS 1,102,312 3/1961 Germany .................. 219/69 E

*Primary Examiner*—Bruce A. Reynolds
*Attorney, Agent, or Firm*—Hammond & Littell

[57] ABSTRACT

The invention provides a device for positioning and for holding firmly in a desired position with respect to the vertical an electrode for use in electric spark machining apparatus. The device comprises three horizontal discs in register. The top disc attaches to a spindle and the bottom disc accepts an electrode. The top and middle discs are connected by a settable peripherally located loosely fitting screw; and the middle and bottom discs are connected in similar manner, the screws being positioned 90° apart in the horizontal plane. A pair of rotatable ball bearings, each in an upper and lower socket, acts as fulcrums and spacers, permitting the adjacent discs to be held in register, tilted, and held fixedly in two planes. The tilting effort for each pair of discs is provided by a loosely-fitting spring-loaded adjustable screw positioned diametrically opposite the coupling screw.

3 Claims, 6 Drawing Figures

ADJUSTABLE ELECTRODE POSITIONING DEVICE FOR ELECTRIC SPARK MACHINING APPARATUS

This invention relates to fine level adjusting devices. Particularly, this invention relates to an improved fine level adjusting device in an apparatus for electric spark machining or for electrolytic machining.

When a spark is discharged in a processing solution through an electrode attached to the spindle of an electric spark machining apparatus to machine work therein, the electrode must be accurately mounted on the spindle of the apparatus and the level position thereof must be precisely adjusted.

In some of such electric spark machining apparatus having an electrode directly mounted to the spindle of the apparatus according to the prior art, since the level position of the electrode could not be adjusted, a level adjusting device has been interposed between the spindle and the electrode to solve the problem.

Such a level adjusting device of the prior art comprises two plate members so as to adjust the level with respect to axes of ordinate and of abscissa on the plane of the plate members. The conventional level adjusting device, however, is disadvantageous in that the adjustment of the level with reference to the horizontal and vertical axes of ordinate and abscissa must be repeated a number of times, since when the level with reference to the horizontal axis, is adjusted the vertical axis tends to change.

In some cases, an electric spark machining apparatus requires a heavy electrode, therefore, the level adjusting device should be sufficiently strong to stand such a weight.

In addition, when an electrode having a large area is used, and if the electrode is moved suddenly in the processing solution by moving the spindle vertically, a great force of the processing solution acting on the large area of the electrode is transmitted to the level adjusting device interposed between the spindle and the electrode, whereby the level adjustment will be deviated.

One object of the present invention is to provide an improved fine level adjusting device in an electric spark machining apparatus, which is simple in construction, very easy to adjust and capable of accurately adjusting the level of an electrode.

Another object of the present invention is to provide an improved fine level adjusting device in an electric spark a machining apparatus, which can sustain a heavy electrode without changing the precision of its adjustment.

Other objects, featues and advantages of the present invention will become more apparent as the description proceeds, when considered with the accompanying drawings in which.

Figure 1:
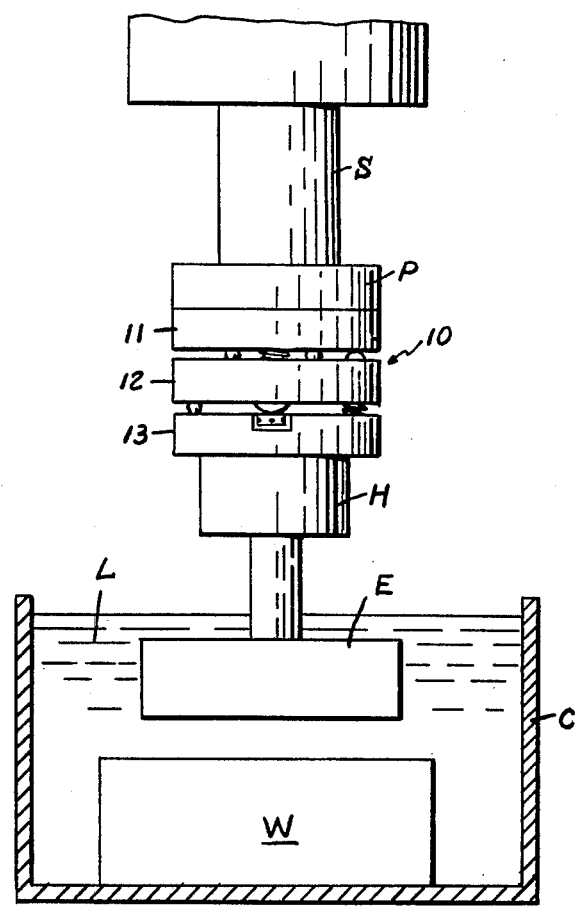
FIG. 1 is a front view of a fine level adjusting device attached to the spindle of an electrolytic machining apparatus.

Referring first to FIG. 1, there is shown an embodiment of a fine level adjusting device 10 according to the present invention. The fine level adjusting device 10 is attached to the bottom end of vertical spindle S of an electric spark machining apparatus at the upper surface of the device 10 through a mounting plate P, and it is provided with an electrode holder H secured to the lower surface of the device to hold an electrode E. During the machining, the electrode E is immersed in a processing liquid L in a cell C to machine a work W by electric spark discharge.

The fine level adjusting device 10 comprises three plate members or discs 11, 12 and 13 of the equal diameter, a first coupling means 20 to couple the first or top disc 11 with the second or intermediate disc 12, a second coupling means 30 to couple the second disc 12 with the third or bottom disc 13, a first adjusting means 40 with reference to the axis of the ordinate X—X passing through the center line of the discs and a second adjusting means 50 with reference to the axis of the abscissa Y—Y which is orthogonal to the axis X—X, said discs 11, 12 and 13 being coupled with each other so as to be superposed leaving desired spaces therebetween.

Figure 2:
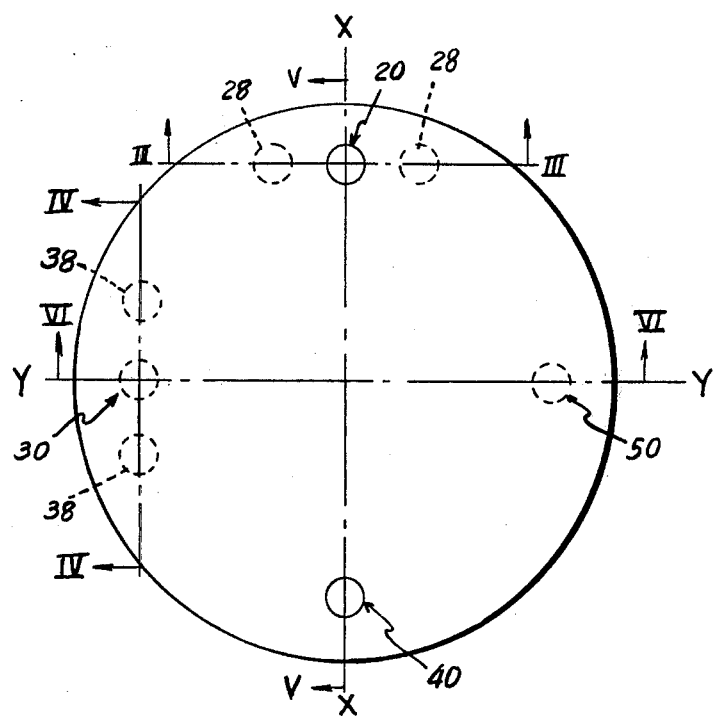
FIG. 2 is a top plan view of the fine level adjusting device of the present invention.
Figure 3:
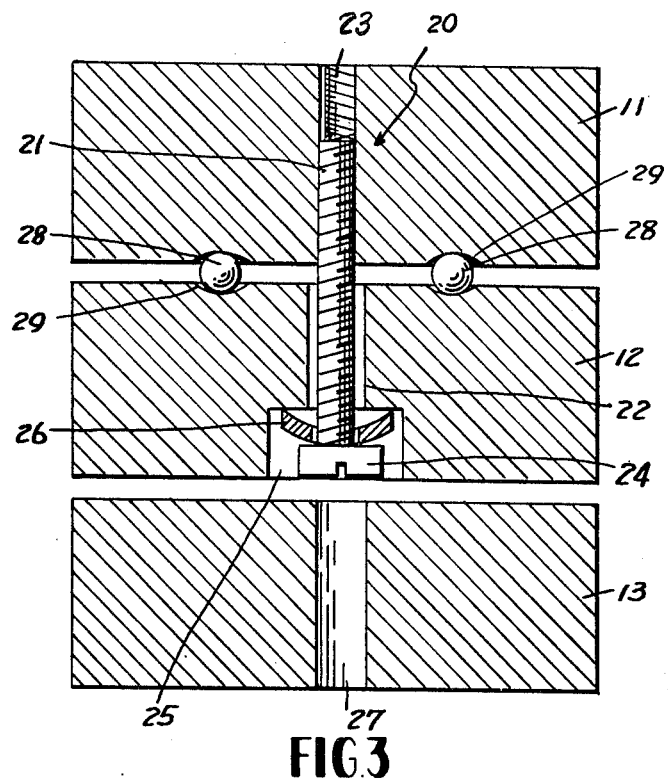
FIG. 3 is a sectional view taken in the direction of the arrows substantially along line III—III of FIG. 2.

As shown in FIG. 2, the first means 20 for coupling the top disc 11 with the intermediate disc 12 has a clamping screw member 21 (shown in FIG. 3) located on the axis X—X (passing through the center of the discs) adjacent to the peripheral edges of the discs 11 and 12. As particularly shown in FIG. 3, the clamping screw member 21 is first passed through oversize hole 22 in the second or intermediate disc 12, then it is screwed into a tapped hole 23 in the first or top disc 11. The head 24 of the clamping screw member 21 is received together with a washer 26 in a depression 25 at the bottom end of hole 22 in intermediate disc 12. The third or bottom disc 13 is also provided with a hole 27 which serves as an opening for adjusting the clamping screw member 21 with a tool such as a screw driver (not shown). The washer 26 has an arc surface in section and its curved surface is contacted with the flat surface of the head 24 of the screw member as shown in FIG. 3.

A pair of balls 28 are interposed between the top disc 11 and the intermediate disc 12 to maintain a predetermined space therebetween. The balls 28 are positioned respectively symmetrically on both sides of the clamping screw member 21 leaving a predetermined space therebetween and on the lines parallel to the axis Y—Y (passes through the center of the discs at right angles to line X—X). Dents 29 are provided respectively in the under surface of the top disc 11 and in the corresponding positions in the top surface of the intermediate disc 12 to receive the balls 28.

Figure 4:
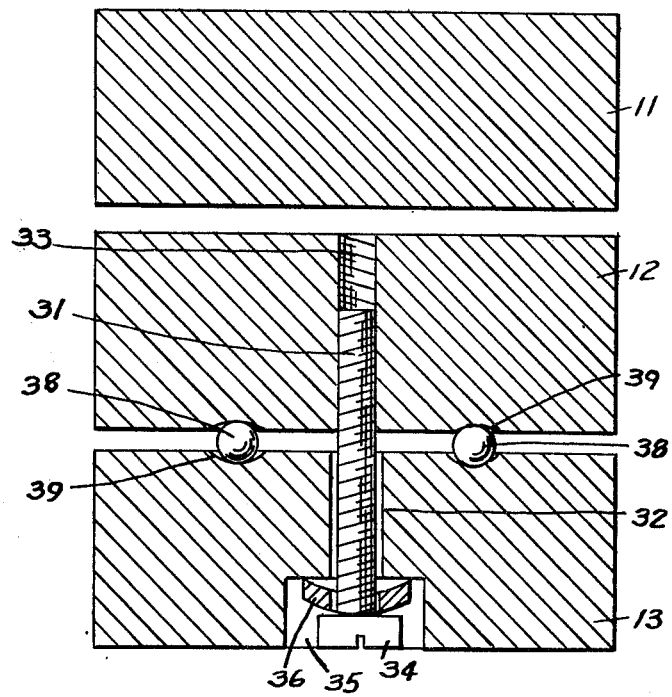
FIG. 4 is a sectional view taken in the direction of the arrows substantially along line IV—IV of FIG. 2.

The second means 30 for coupling the second or intermediate disc 12 with the third or bottom disc 13 is substantially similar to the above-mentioned first coupling means 20 in construction. As shown in FIG. 2, the second coupling means 30 has a clamping screw member 31 on the axis Y—Y which is orthogonal to the axis X—X at the center of the discs, and is located adjacent to the peripheral edges of the discs 12 and 13. As shown in FIG. 4, the clamping screw member 31 is first passed through oversize hole 32 in the bottom disc 13, then it is screwed into a tapped hole 33 in the intermediate disc 12. The head 34 of the clamping screw member 31 is received together with a washer 36 having an arc cross section, in a depression 35 formed under the hole 32 in the bottom disc 13.

The washer 36 may be similar to the washer 26 in shape and the curved under face of the washer 36 is contacted with the flat under surface of the head 34.

A pair of balls 38 are interposed between the intermediate disc 12 and the bottom disc 13 to maintain a predetermined space therebetween. The balls 38 are positioned respectively on both sides of the coupling screw member 31 leaving a predetermined space therebetween and on the lines parallel to the axis X—X passing through the center of the discs. Dents 39 are provided respectively in the under surface of the intermediate disc 12 and in the corresponding positions in the top surface of the bottom disc 13 to receive the balls 38.

Since the screws are loose-fitting, it is the pairs of balls in their dents or sockets which maintain the three discs in register.

Figure 5:
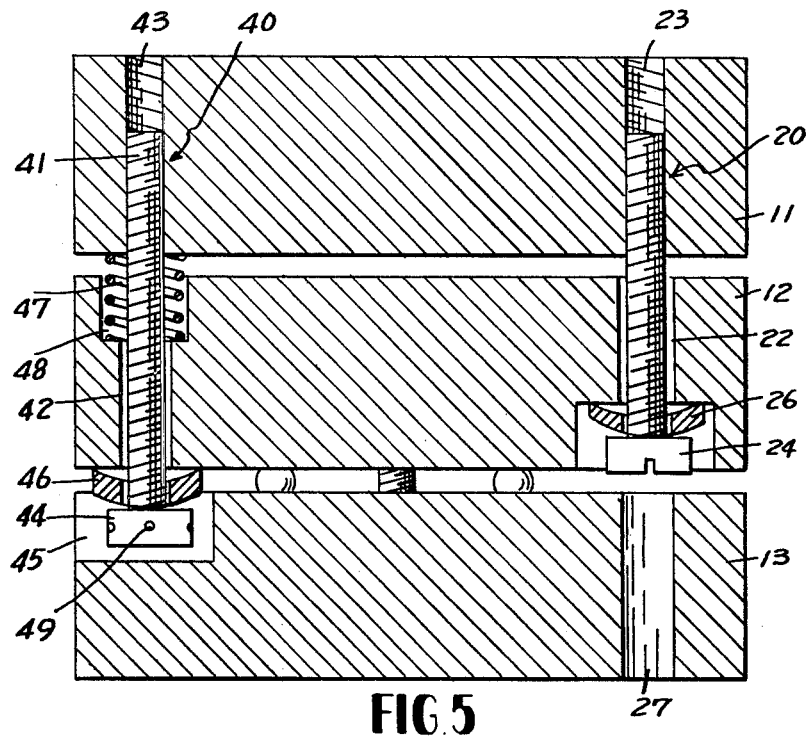
FIG. 5 is a sectional view taken in the direction of the arrows V, V substantially along the axis of the ordinate X—X of FIG. 2.

Now the first adjusting means 40 with reference to the axis X—X of the ordinate will be described. The first adjusting means 40 is positioned opposite to the first coupling means 20 on the axis X—X, as shown in FIG. 2. The first adjusting means 40 comprises an adjusting screw member 41, a wahser 46 and a coiled spring 47, as clearly shown in FIG. 5. The adjusting screw member 41 is passed through a hole 42 in the intermediate disc 12 and then it is screwed into a tapped hole 43 in the top disc 11. The head 44 of the adjusting screw member 41 is received in a side-open depression 45 formed in the top side of the bottom disc 13 so as to be approachable from the side. The washer 46 may be similar to the aforementioned washer 26 and 36, except that the washer 46 has the arc top surface and the arc under surface contacts the inner flat surface of the head 44 of the adjusting screw member 41. The head 44 is provided with a plurality of openings 49 in the side wall thereof. These openings 49 are used to turn the adjusting screw member 41 with a suitable tool inserted from the open side of the depression 45. The hole 42 in the disc 12 has an enlarged upper end portion 48 which is opened at the top surface of the disc 12. The coiled spring 47 surrounds the adjusting screw member 42 and the lower end of the coiled spring 47 is seated on the inner end surface of the enlarged upper end hole portion 48 while the upper end of the spring 47 butts against the bottom surface of the top disc 11.

Figure 6:
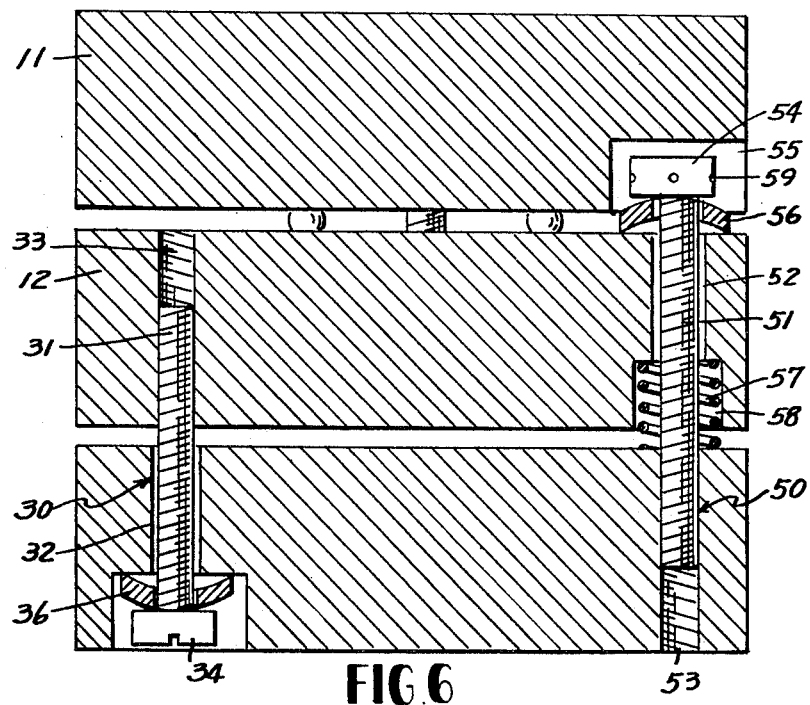
FIG. 6 is a sectional view taken in the direction of the arrows VI, VI along the axis of abscissa Y—Y of FIG. 2.

Next, the second adjusting means 50 with reference to the axis of the abscissa Y—Y will be described. The construction of the second adjusting means 50 is similar to that of the first adjusting means 40. As shown in FIG. 6, the second adjusting means 50 comprises an adjusting screw member 51, a washer 56 and a coiled spring 57. The adjusting screw member 50 is passed through oversize hole 52 in the intermediate disc 12 and then it is screwed into a tapped hole 53 in the bottom disc 13. The head 54 of the adjusting screw member 51 is received in a side-open depression 55 formed in the bottom side of the top disc 11 so as to be approachable from the side. The washer 56 has an arc cross-section as in case of the aforementioned washers 26, 36 and 46. The curved top surface of the washer 56 butts against the flat surface of the head 54 of the adjusting screw member. The head 54 is provided with a plurality of openings 59 in the side wall thereof. These openings 59 are used to turn the adjusting screw member 51 with a suitable tool inserted from the open side of the depression 55. The hole 52 in the intermediate disc 12 has an enlarged lower end portion 58 which is opened at the bottom surface of the disc 12. The coiled spring 57 surrounds the adjusting screw member 52 in the enlarged lower end hole portion 58 and the upper end of the spring 57 is seated on the inner end surface of the enlarged lower end hole portion 58 while the lower end of the spring 57 butts against the top surface of the bottom disc 13.

Since the fine level adjusting device of the present invention is constructed as described hereinabove, the discs 11, 12 and 13 may be intercoupled leaving a predetermined space therebetween by the first and second clamping screw members 21 and 31, without fear of their separation.

The adjustment of the level for establishing a true horizontal with reference to the axis X—X of the ordinate relating to the surface of the electrode E by using the fine level adjusting device of the present invention to which the electrode E has been secured, may be accomplished by inserting a suitable tool into the openings 49 in the head 44 of the screw member 41 of the first adjusting means 40 and slightly turning the screw member 41 clockwise or counterclockwise as required. For example, in the plane shown in FIG. 2, when the head 44 of the screw member 41 is slightly turned in the counterclockwise direction, the washer 46 pushes up the intermediate disc 12 as the screw member 41 is advanced upward into the tapped hole 43 in the top disc 11 and, thus the spring 47 is biased accordingly. In other words, in the position of the first adjusting screw member 41, the space between the top disc 11 and the intermediate disc 12 tends to be reduced. On the other hand, on the side of the coupling means 20 opposite to the coupling means 40 along the axis X—X, the balls 28 interposed between the top and intermediate discs 11 and 12 serve as fulcrums and the top disc 12 is inclined with reference to the axis X—X. In this case, the screw members 41 and 21 tend to be slightly inclined in oversize holes 22 and 42 in intermediate disc 12 respectively. Since the screw members 41 and 21, however, are respectively provided with the washers 46 and 26 having arc surfaces butting against the flat inner surface of the heads 44 and 24 respectively, such inclination of the screw members 41 and 21 is tolerated. The case wherein the screw member 41 is turned clockwise instead of counterclockwise, can be readily understood from the above description. By slightly turning the screw member 41 of the first adjusting means 40 in this manner, any desired inclination of the top and intermediate discs 11 and 12, i.e. of the fine level adjusting device 10 with reference to the vertical axis can be established.

The adjustment of the level with reference to the axis Y—Y of the abscissa with the fine level adjusting device 10 of the present invention can be accomplished by turning the second adjusting screw member 51 on the axis Y—Y in the same manner as described hereinabove in connection with the first adjusting screw member 31, and therefore, the detailed description thereof is omitted.

Although the invention has been described in its preferred embodiment the preferred embodiment can be changed in the combination and arrangement of its parts without departing from the spirit and the scope of the present invention as hereinafter claimed.

What we claim is:

1. In an adjustable electrode positioning device for use with electric spark machining apparatus comprising a first disc adapted to secure said device to a spindle of said apparatus, a second disc, and a third disc adapted to hold an electrode means, said first, second and third discs being coupled to each other in sequential aligned position along a center axis defined by said discs, the improvement comprising: (A) a first clamping screw means having a head disposed adjacent to the peripheral edges of said first and second discs, said first clamping screw means being passed loosely through a hole in said second disc and threaded into said first disc, said head being received together with a washer in a depression formed under the hole in said second disc, (B) a first adjusting means having a head positioned diametrically opposite to said first clamping screw means, said first adjusting means being passed loosely through a hole in said second disc and threaded into said first disc, the head of said first adjusting means being received together with a washer in a depression formed under the hole in said second disc, a coiled spring being disposed about said first adjusting means between said first and second disc; (C) a pair of balls each in an upper and lower socket positioned symmetrically relative to said first clamping screw means on a line passing through a center of said first clamping screw means and a first line which passes through a center of each of said first clamping screw means and said first adjusting means; (D) a second clamping screw means having a head disposed adjacent to the peripheral edges of said second and third discs and on a second line which intersects perpendicularly with said first line at the center of said second and third discs, said second clamping screw means being passed loosely through a hole in said third disc and threaded into said second disc, the head of said second clamping screw means being received together with a washer in a depression formed under the hole in said third disc; (E) a second adjusting means having a head positioned diametrically opposite to said second clamping screw means, said second adjusting means being passed loosely through a hole in said second disc and threaded into said third disc, the head of said second adjusting means being received together with a washer in a depression formed in said first disc; a coiled spring being disposed about said second adjusting means between said second and third discs; and (F) a pair of balls each in an upper and lower socket positioned symmetrically relative to said second clamping screw means and on a third line passing through a center of said second clamping screw means and intersecting perpendicularly with said second line.

2. An adjustable electrode positioning device according to claim 1 wherein said first washer has an arc-shaped cross section, and the surface of the head of said clamping screw means contacts the curved surface of said washer.

3. An adjustable electrode positioning device according to claim 1 wherein the head of said first adjusting means is accessible from said depression.

* * * * *